(No Model.)
J. B. & R. JOHNS.
CLOTHES LINE SUPPORT.
No. 418,413. Patented Dec. 31, 1889.
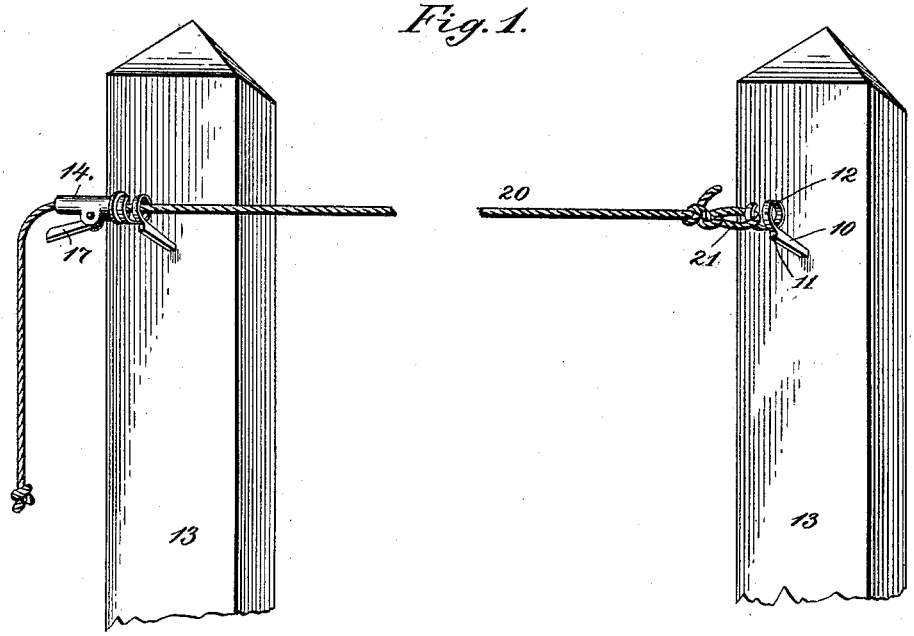
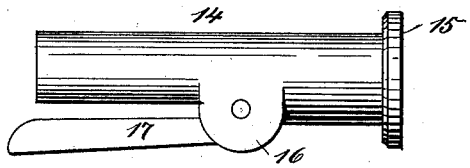
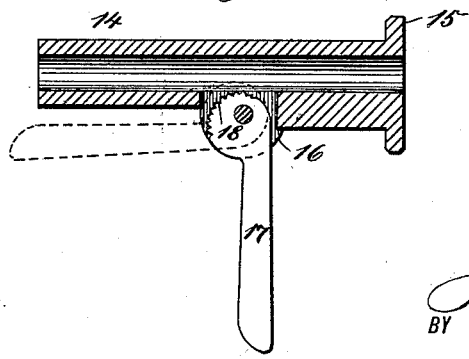
WITNESSES:
D. C. Reusch
C. Sedgwick
INVENTOR:
J. B. Johns
R. Johns
BY
Munn & Co.
ATTORNEYS.

UNITED STATES PATENT OFFICE.

JOHN B. JOHNS AND ROBERT JOHNS, OF FINDLAY, OHIO.

CLOTHES-LINE SUPPORT.

SPECIFICATION forming part of Letters Patent No. 418,413, dated December 31, 1889.

Application filed December 4, 1888. Serial No. 292,595. (No model.)

*To all whom it may concern:*

Be it known that we, JOHN B. JOHNS and ROBERT JOHNS, both of Findlay, in the county of Hancock and State of Ohio, have invented a new and Improved Clothes-Line Support, of which the following is a full, clear, and exact description.

This invention relates to appliances for fastening clothes-lines, the object of the invention being to provide for the quick hanging of the line and the quick removal of the line from its supports; and the invention consists in the construction and arrangement of parts, as will be hereinafter more fully explained, and specifically pointed out in the claim.

Reference is to be had to the accompanying drawings, forming a part of this specification, in which similar figures of reference indicate corresponding parts in all the views.

Figure 1 is a view of two posts, representing the same as they appear when provided with our clothes-line supports, the clamping device being shown in place upon the line. Fig. 2 is a side view of the clamping device, and Fig. 3 is a central longitudinal sectional view of the same.

Our clothes-line support consists, essentially, of a shank 10, formed with a head or shoulder 11, beyond which there is a spiral section 12. This support is driven into a post, as 13; or, if desired, the shank might be threaded and screwed into the post, as will be readily understood, and this form of threaded shank would be the form preferred for indoor use.

In the drawings we have shown but two posts; but it will of course be understood that any number of posts could be employed, each of the posts being provided with one of the line-supports.

The stop employed in connection with the supports consists of a tube-like body 14, formed with a head 15 and with lugs 16, between which lugs there is pivotally mounted a lever 17, having a serrated eccentric face 18, the arrangement being such that when the line (which is shown at 20,) is passed through the bore of the tube 14 it will be clamped firmly therein if the lever 17 be turned to the position indicated by dotted lines in Fig. 3.

In applying the line to our supports we form a knot, as 21, at one end of the line, or we connect an eye or hook to the end of the line in place of the knot. The loop of the knot or the eye or hook is then brought into engagement with one of the supports, and the line is carried to the adjacent support and passed through the spiral section 12, the formation of this section being such that by passing the line over the shank 10 and drawing it up between the two parallel lengths of spiral section the line will enter the eye of the spiral, as shown upon the left in Fig. 1. When the line has been passed through the last support, the tube-like stop 14 is forced up with its head 15 against the support and the lever 17 turned down to clamp the line to place, thus securely holding the line and preventing the same from slipping. The head 15 of the stop 14 is of greater diameter than the opening or eye of the support, and hence it cannot slip therethrough. If the supports simply had apertures for the line to pass through, the stop 14 would have to be first removed from the line every time the rope was to be detached, and the rope would have to (when it was to be used again) be first passed through said aperture and then through the stop; but by having the support provided with an open hook or eye the line may be readily removed without disconnecting stop 14, and said stop, by having the head or flange 15, will not slip through said open eye or hook. To remove the line, the lever is thrown back and the stop slid away from the support, after which the line may be readily removed from the supports.

From the construction described it will be seen that all knotting of the line at the intermediate supports is dispensed with and that any slack which there may be in the line may be readily taken up.

Having thus described our invention, we claim as new and desire to secure by Letters Patent—

The combination, with the posts having supports 10, provided with open eyes or hooks 12, and the clothes-line secured to one eye and passed through the other, of the stop formed of a slotted tube 14, sliding on the line and provided at one end with a flange 15, resting against the eye through which the line passes, and provided with a lever 17, pivoted in said slot and having a cam or head extending into the bore of the tube against the line, substantially as set forth.

JOHN B. JOHNS.
ROBERT JOHNS.

Witnesses:
H. F. BURKET,
C. J. OLLER.